US012673569B2

(12) United States Patent
Mondello et al.

(10) Patent No.: US 12,673,569 B2
(45) **Date of Patent: *Jul. 7, 2026**

(54) ELECTRIC VEHICLE CHARGING STATION SYSTEM

(71) Applicant: Micron Technology, Inc., Boise, ID (US)

(72) Inventors: Antonino Mondello, Messina (IT); Alberto Troia, Munich (DE)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/358,937

(22) Filed: Jun. 25, 2021

(65) Prior Publication Data

US 2021/0323427 A1 Oct. 21, 2021

Related U.S. Application Data

(63) Continuation of application No. 16/363,060, filed on Mar. 25, 2019, now Pat. No. 11,046,201.

(51) Int. Cl.
*B60L 53/30* (2019.01)
*B60L 53/68* (2019.01)
(Continued)

(52) U.S. Cl.
CPC .............. *B60L 53/30* (2019.02); *B60L 53/68* (2019.02); *G06F 21/64* (2013.01); *H02J 7/14* (2013.01);
(Continued)

(58) Field of Classification Search
CPC ...... B60L 53/30; B60L 53/68; B60L 2270/38; G06F 21/64; H02J 7/14; H04L 67/04
(Continued)

(56) References Cited

U.S. PATENT DOCUMENTS 8,415,918 B2 4/2013 Tonegawa
9,699,685 B1 * 7/2017 Zhou .................... G01R 31/371
(Continued)

FOREIGN PATENT DOCUMENTS

CN 103873473 B 1/2017
DE 102009030091 12/2010
(Continued)

OTHER PUBLICATIONS

International Search Report and Written Opinion, PCT/US2020/021371, mailed on Jul. 3, 2020.
(Continued)

*Primary Examiner* — Phallaka Kik
(74) *Attorney, Agent, or Firm* — Greenberg Traurig

(57) ABSTRACT

An electric vehicle charging station system having, at least: an EV charging station that includes a supply part configured to supply electric energy to at least one vehicle battery, a computing device configured to manage supplying of electric energy to electric vehicles, and a transactions module of a station application stored in and executable by the computing device of the EV charging station. The transactions module and other modules of or associated with the EV charging station or an electric vehicle can leverage asymmetric cryptography and peer-to-peer networks and systems to provide secure supplying of electric energy from the EV charging station to an electric vehicle and recording of information on the station supplying electric energy to the vehicles.

20 Claims, 9 Drawing Sheets

(51) Int. Cl.
  *G06F 21/64* (2013.01)
  *H02J 7/14* (2006.01)
  *H04L 67/104* (2022.01)

(52) U.S. Cl.
  CPC ......... *H04L 67/104* (2013.01); *B60L 2270/38* (2013.01)

(58) Field of Classification Search
  USPC ................................................ 320/109, 104
  See application file for complete search history.

(56) References Cited

U.S. PATENT DOCUMENTS

| | | | | |
|---|---|---|---|---|
| 9,704,145 | B2 * | 7/2017 | Reddy | G07F 15/005 |
| 10,189,359 | B2 | 1/2019 | Lowenthal et al. | |
| 10,211,725 | B1 | 2/2019 | Piccardi | |
| 10,286,792 | B2 * | 5/2019 | Shelton | B60L 53/65 |
| 11,046,201 | B2 | 6/2021 | Mondello et al. | |
| 11,138,599 | B1 * | 10/2021 | Young | H04L 63/107 |
| 11,665,246 | B2 * | 5/2023 | Murphy | H04L 9/50 |
| | | | | 709/201 |
| 11,692,836 | B2 * | 7/2023 | Mathai | G01C 21/3697 |
| | | | | 701/516 |
| 11,694,288 | B2 * | 7/2023 | Cella | G07C 5/08 |
| | | | | 701/533 |
| 11,875,418 | B2 * | 1/2024 | Ibrahim | G07F 13/025 |
| 11,892,746 | B1 * | 2/2024 | Mazed | G02F 3/00 |
| 11,892,834 | B2 * | 2/2024 | Cella | G06Q 30/0208 |
| 11,934,186 | B2 * | 3/2024 | Cella | G06Q 30/0208 |
| 11,961,155 | B2 * | 4/2024 | Cella | G05D 1/227 |
| 12,028,459 | B2 * | 7/2024 | Huang | H04L 9/3265 |
| 12,039,558 | B2 * | 7/2024 | Price | G06Q 30/0206 |
| 12,065,048 | B2 * | 8/2024 | McNamara | B60L 53/305 |
| 12,074,460 | B2 * | 8/2024 | Glover | H02J 50/20 |
| 12,094,021 | B2 * | 9/2024 | Cella | G05D 1/81 |
| 12,118,628 | B2 * | 10/2024 | Orsini | G05B 19/042 |
| 12,218,947 | B2 * | 2/2025 | Simons | G06N 20/00 |
| 12,246,614 | B2 * | 3/2025 | Kwapisz | B60L 53/38 |
| 12,278,491 | B2 * | 4/2025 | Wang | H04L 9/50 |
| 2004/0006497 | A1 * | 1/2004 | Nestor | G06Q 10/02 |
| | | | | 705/5 |
| 2010/0211643 | A1 | 8/2010 | Lowenthal et al. | |
| 2011/0213983 | A1 | 9/2011 | Staugaitis et al. | |
| 2012/0166011 | A1 | 6/2012 | Oba et al. | |
| 2012/0296678 | A1 | 11/2012 | Boot et al. | |
| 2013/0038424 | A1 | 2/2013 | Katar et al. | |
| 2013/0088199 | A1 | 4/2013 | Matsuno et al. | |
| 2013/0145159 | A1 | 6/2013 | Nakaoka et al. | |
| 2013/0160086 | A1 | 6/2013 | Katar et al. | |
| 2014/0316939 | A1 | 10/2014 | Uyeki | |
| 2015/0239357 | A1 | 8/2015 | Huntzicker et al. | |
| 2015/0264015 | A1 * | 9/2015 | Cialdea | G06F 21/6245 |
| | | | | 726/26 |
| 2017/0358041 | A1 * | 12/2017 | Forbes, Jr. | G05D 3/12 |
| 2018/0001776 | A1 | 1/2018 | Kim et al. | |
| 2018/0272886 | A1 | 9/2018 | Stöcker et al. | |
| 2019/0215404 | A1 * | 7/2019 | Stöcker | H04W 8/02 |
| 2019/0225107 | A1 * | 7/2019 | Morizono | H02J 7/0013 |
| 2019/0279227 | A1 * | 9/2019 | Chantz | G06Q 30/018 |
| 2019/0385182 | A1 * | 12/2019 | Price | G06Q 50/06 |
| 2020/0200824 | A1 * | 6/2020 | Narayanaswami | H04L 67/12 |
| 2020/0213329 | A1 * | 7/2020 | Simons | G06F 21/6254 |
| 2020/0307401 | A1 | 10/2020 | Mondello et al. | |
| 2022/0118878 | A1 * | 4/2022 | Kwapisz | B60L 53/66 |
| 2022/0121260 | A1 * | 4/2022 | King | G06F 1/28 |
| 2022/0254206 | A1 * | 8/2022 | Dykstra | H04L 63/08 |
| 2023/0068532 | A1 * | 3/2023 | Forbes, Jr. | G06Q 30/08 |
| 2023/0176567 | A1 * | 6/2023 | Cella | A61B 5/168 |
| | | | | 704/270 |
| 2023/0242009 | A1 * | 8/2023 | Sastinsky | G05B 13/024 |
| | | | | 700/33 |
| 2024/0127371 | A1 * | 4/2024 | Ibrahim | G06Q 50/06 |
| 2024/0310840 | A1 * | 9/2024 | Williams | G05D 1/695 |
| 2024/0310892 | A1 * | 9/2024 | King | G06F 1/28 |
| 2024/0399908 | A1 * | 12/2024 | Mcnamara | H02J 3/38 |
| 2025/0112476 | A1 * | 4/2025 | Malik | H01R 13/6397 |
| 2025/0115152 | A1 * | 4/2025 | Badgery | B60L 53/305 |
| 2025/0182024 | A1 * | 6/2025 | Sheikh | G06Q 20/02 |
| 2025/0183677 | A1 * | 6/2025 | Malik | B60L 53/67 |
| 2025/0216919 | A1 * | 7/2025 | King | G06F 1/28 |
| 2025/0220024 | A1 * | 7/2025 | Simons | H04L 9/3226 |

FOREIGN PATENT DOCUMENTS

| | | | |
|---|---|---|---|
| DE | 102017100523 | 1/2017 | |
| EP | 2420401 A1 * | 2/2012 | B60L 11/1825 |
| JP | 2012059270 | 3/2012 | |
| KR | 20170049905 | 5/2017 | |
| KR | 20170049905 A | 5/2017 | |

OTHER PUBLICATIONS

Extended European Search Report, EP20777895.2, mailed on Nov. 29, 2022.

Li, Jianpo, et al., "Intelligent Information management System with RFID for Electric Vehicle Charging Station." Process Automation Instrumentation, Abstract Only, Nov. 20, 2013.

* cited by examiner

400

Figures 6, 7:
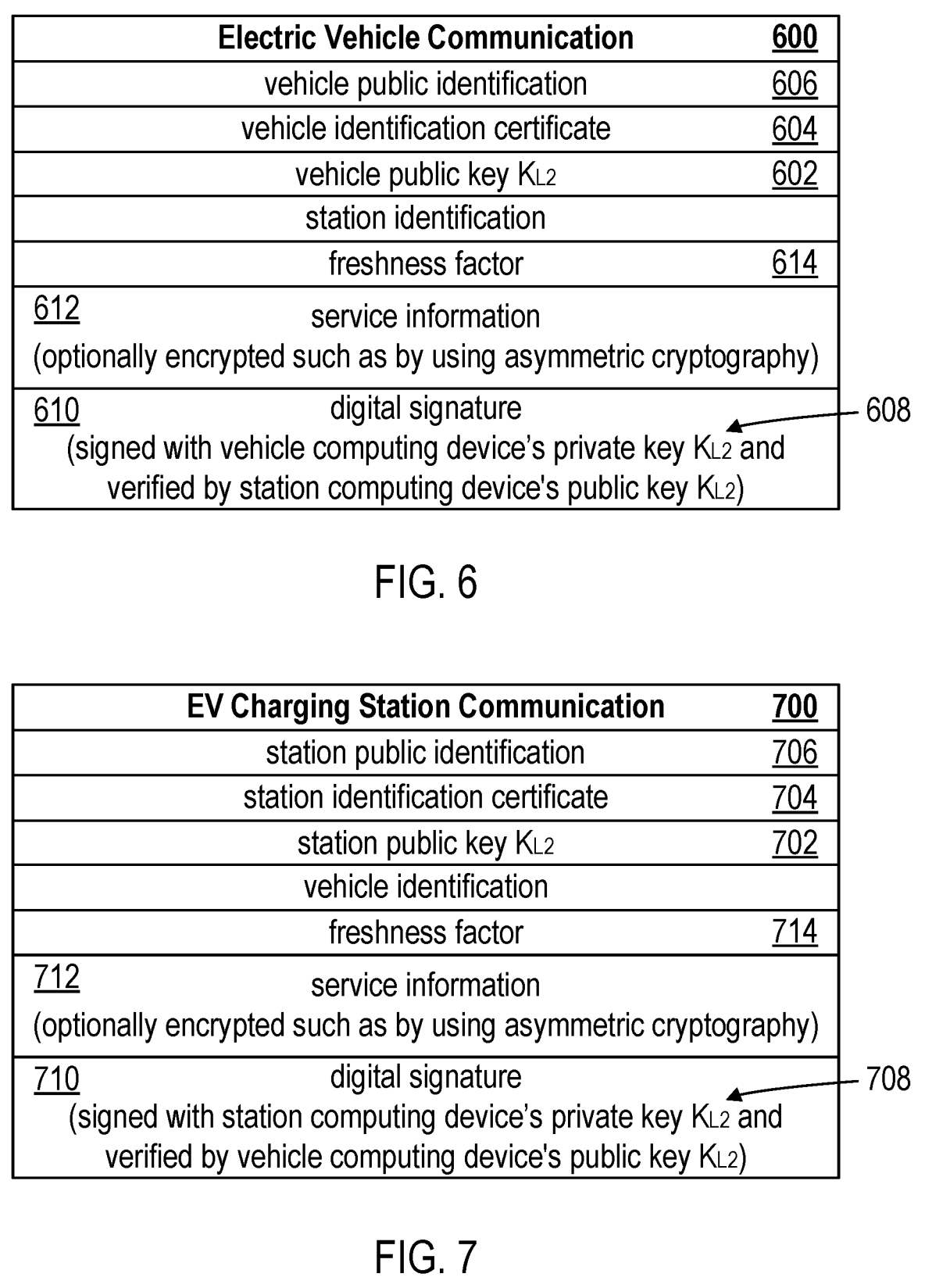

| Electric Vehicle Communication | 600 |
|---|---|
| vehicle public identification | 606 |
| vehicle identification certificate | 604 |
| vehicle public key $K_{L2}$ | 602 |
| station identification | |
| freshness factor | 614 |
| 612  service information (optionally encrypted such as by using asymmetric cryptography) | |
| 610  digital signature (signed with vehicle computing device's private key $K_{L2}$ and verified by station computing device's public key $K_{L2}$) | |

| EV Charging Station Communication | 700 |
|---|---|
| station public identification | 706 |
| station identification certificate | 704 |
| station public key $K_{L2}$ | 702 |
| vehicle identification | |
| freshness factor | 714 |
| 712  service information (optionally encrypted such as by using asymmetric cryptography) | |
| 710  digital signature (signed with station computing device's private key $K_{L2}$ and verified by vehicle computing device's public key $K_{L2}$) | |

ELECTRIC VEHICLE CHARGING STATION SYSTEM

RELATED APPLICATIONS

The present application is a continuation application of U.S. patent application Ser. No. 16/363,060, filed Mar. 25, 2019, issued as U.S. Pat. No. 11,046,201 on Jun. 29, 2021, and entitled "Electric Vehicle Charging Station System," the entire disclosure of which application is hereby incorporated herein by reference.

FIELD OF THE TECHNOLOGY

At least some embodiments disclosed herein relate to electric vehicle charging station systems in general, and more particularly, to electric vehicle charging station systems using asymmetric cryptography and peer-to-peer networks and systems.

BACKGROUND

An electric vehicle charging station, also known as an EV charging station, is an element in an infrastructure that supplies electric energy for the recharging of electric vehicles, such as plug-in electric vehicles, including electric cars, neighborhood electric vehicles and plug-in hybrids. Some electric vehicles have onboard converters that can plug into a standard electrical outlet or a high-capacity appliance outlet. Other electric vehicles can need or use a charging station that provides electrical conversion or monitoring. The stations are also needed when vehicles are traveling greater distances. The EV charging stations can support faster charging at higher voltages and currents than are available from residential electric vehicle service equipment. Public EV charging stations are typically on-street facilities provided by electric utility companies or located at retail shopping centers and operated by private companies.

Asymmetric cryptography, also known as public-key cryptography, is a cryptographic system that uses pairs of keys: public keys which may be disseminated widely, and private keys which are known only to the owners of the private keys. Asymmetric cryptography provides authentication in that the public key verifies that a holder of the paired private key sent the message, and encryption in that only the paired private key holder can decrypt the message encrypted with the public key. In an asymmetric cryptography system, any person can encrypt a message using the receiver's public key. That encrypted message can only be decrypted with the receiver's private key. Effective security requires keeping the private key private, and the public key can be openly distributed.

Peer-to-peer (P2P) computing or networking is a distributed application architecture that partitions tasks or workloads between peer computing devices. Peer computing devices can be equally privileged participants in the application. The peer computing devices are said to form a peer-to-peer network of nodes. Peer computing devices, which are independently operating devices with respect to each other, make a portion of their resources, such as processing power, disk storage or network bandwidth, directly available to other network participants without the need for central coordination by servers or other types of central computing devices.

BRIEF DESCRIPTION OF THE DRAWINGS

The present disclosure will be understood more fully from the detailed description given below and from the accompanying drawings of various embodiments of the disclosure.

FIG. 6 illustrates example data included in an example communication sent from an example computing device of an example electric vehicle to an example computing device of an example EV charging station, in accordance with some embodiments of the present disclosure.

FIG. 7 illustrates example data included in an example communication sent from an example computing device of an EV charging station to an example computing device of an example electric vehicle, in accordance with some embodiments of the present disclosure.

DETAILED DESCRIPTION

Figure 1:
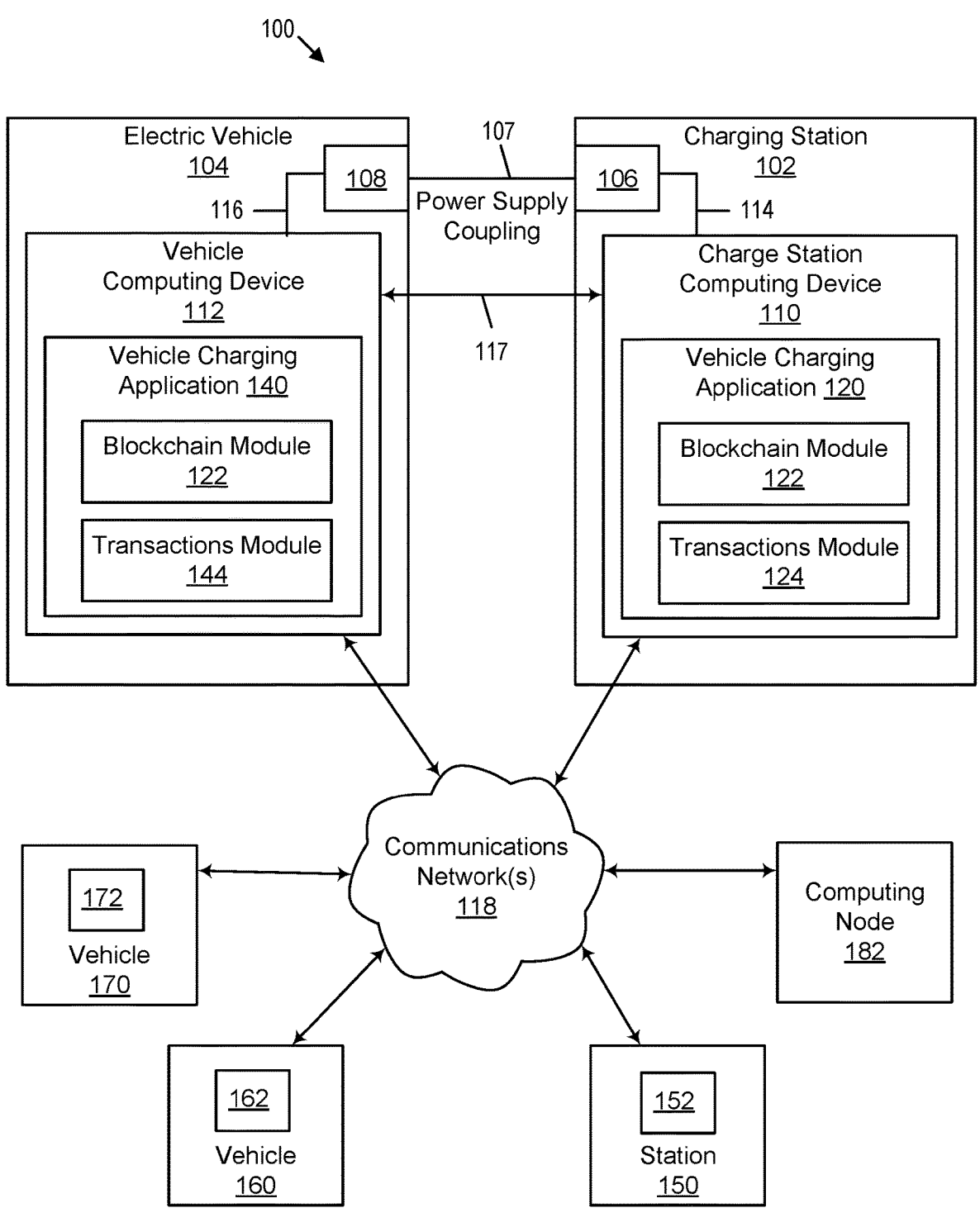
FIG. 1 illustrates an example computing system that can implement an electric vehicle charging station system using asymmetric cryptography and one or more peer-to-peer networks and systems, in accordance with some embodiments of the present disclosure.

At least some aspects of the present disclosure are directed to electric vehicle charging station systems using asymmetric cryptography and/or peer-to-peer networks and systems. In some examples, the systems use blocks of a blockchain to record information on instances of EV charging stations supplying electric energy to electric vehicles.

In some embodiments, the systems use of asymmetric cryptography for message exchange between vehicles and charging stations. The systems can use certificates based on asymmetric cryptography to show the identities of the devices of the vehicle and the charging station. Also, the systems can use a peer-to-peer network and system to maintain integrity of the message exchanges between EV charging stations and vehicles. For example, a blockchain network and system can be used by some examples of the system.

The aforementioned features can be used to secure and maintain integrity of transactions between a vehicle and an EV charging station. The message exchange between these parties is a process that can be secured via a device identity composition system. The transaction records and/or statuses resulting from the message exchange can be stored on blockchain in some embodiments. Thus, the integrity of the records is protected by blockchain. Asymmetric cryptography can be used for mutual authentication between a vehicle and a charge station, which can be found in the implementation of the certificates, digital signatures on the exchanged messages, and/or the device identity composition system. Each party has a public key of the other party from the mutual authentication. Both parties can accept each other's certificate where there is a subscription activated for example. Also, the exchanging of the certificates can confirm each identity and that the parties know each other as well as confirm that a subscription exists between the vehicle and station such that a payment can be processed according to the subscription.

The device identity composition system can be used for the asymmetric cryptography. In such embodiments, the private key can be or can be based on a secret value called Unique Device Secret (UDS) that is injected during manufacture of a computing device of the vehicle and/or a computing device of the EV charging station. Also, in some embodiments, the device identity composition system can include layer $L_0$ that derives $K_{L0}$, the Fuse Derived Secret (FDS), by using a key derivative function (KDF). Algorithmically, $K_{L0}$=KDF [UDS, HASH("Identity of $L_1$")]. The other layers (Lk) can provide to the next ones (Lk+1) a set of keys and certificates. The layers being layers of a device architecture starting with the immutable loader $L_0$, then the device identity composition system core $L_1$, application firmware $L_2$, operating system and applications $L_{k+1}$. Each layer can provide integrity for the next layer and so on. And, each layer can verify the certificates showing identities of the devices of the vehicle and the EV charging station.

Also, to avoid man-in-middle attacks, the vehicle and EV charging station message exchanges can be packed with the status of charge that occurs during charging of the vehicle. Man-in-middle attacks can occur by another vehicle approaching the station while the valid vehicle is authenticated for charging with the station. After valid vehicle and the station have been mutually authenticated to start a charging session, and in the middle of the session, the other vehicle may connect to the station. This may cause the charging to the other vehicle to be billed to the valid vehicle. To keep this from happening, the valid vehicle and the station can also regularly communicate signed messages during the session to avoid the other vehicle to charge using the billing information of valid vehicle. Also, each message from the valid vehicle can be differentiated by including a freshness factor in each message so that the other vehicle cannot simply record a message received from the valid vehicle and resend it again and again and pretend to be the valid vehicle. Also, the messages can be signed by the valid vehicle so that the other vehicle cannot imitate the valid vehicle.

Also, one or more ledgers (such as one or more blocks of a blockchain) can be used to record messages exchanged between vehicles and stations. For example, each station can have its own ledger associated with it. Each ledger can be implemented by a blockchain, so that each recorded message in the ledger can maintain its integrity through the hashing features of blocks of a blockchain.

In some embodiments, each block of a blockchain can present a message or multiple messages sent by either a vehicle or a station. Or, each block of a blockchain can present an instance of an electric energy supplying transaction between a vehicle and a station. Each block can include a header having the hash of the previous block and a hash of itself. The hash of itself can be the data of the block encoded or hashed into a Merkle tree or some other algorithm can be used. Because each block has a hash of the previous block, blocks cannot be invalidly replaced by attackers and the chain can maintain its integrity. A block can also have one or more instances of power supplying transactions between one or more vehicles and one or more stations.

FIG. 1 illustrates an example computing system 100 that can implement an electric vehicle charging station systems using asymmetric cryptography and one or more peer-to-peer networks and systems, in accordance with some embodiments of the present disclosure. The system 100 includes at least an EV charging station 102, an electric vehicle 104, one or more communications networks 118, additional vehicles such as vehicles 160 and 170, an additional EV charging station 150, and at least one typical computing node of a peer-to-peer network such as computing node 182.

The EV charging station 102 includes at least a supply part 106, a charge station computing device 110 having a vehicle charging application 120 that includes blockchain module 122 and transactions module 124, and a communicative coupling 114 between the charge station computing device 110 and the supply part 106. A power supply coupling 107 can physically connect the supply part 106 of the station 102 with a battery of a vehicle, such as battery 108 of electric vehicle 104.

The electric vehicle 104 includes at least battery 108, a vehicle computing device 112 having a vehicle charging application 140 that includes blockchain module 122 and transactions module 144, and a communicative coupling 116 between the vehicle computing device 112 and the battery 108. The power supply coupling 107 can physically connect the supply part 106 of the station 102 with the battery 108. The connection can be through a wire, cable, or another type of medium for transmitting electric energy to supply energy to charge a battery of a vehicle.

The communications network(s) 118 includes at least a wide area network (WAN), a local area network (LAN), an intranet, an extranet, the Internet, and/or any combination thereof.

Each of the vehicles 160 and 170 includes parts of electric vehicles such as the illustrated computing devices 162 and 172. EV charging station 150 also includes a computing device 152 as well as other parts of an EV charging station. The computing devices described herein (such as computing devices 110, 112, 152, 162, and 172) and the example typical computing node of the peer-to-peer network, computing node 182, and/or any other computer system or computing machine described in can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated for each of the illustrated computing devices of FIG. 1 and the computing node 182, the term "machine" shall also be taken to include any collection of machines that individually or jointly execute a set (or multiple sets) of instructions to perform any one or more of the methodologies or operations discussed herein. And, each of the illustrated computing devices of FIG. 1 (and other computing devices described herein) and the computing node 182 can each include at least a bus and/or motherboard, one or more controllers (such as one or more CPUs), a main memory that can include temporary data storage, at least one type of network interface, a storage system that can include permanent data storage, and/or any combination thereof.

Figure 2:
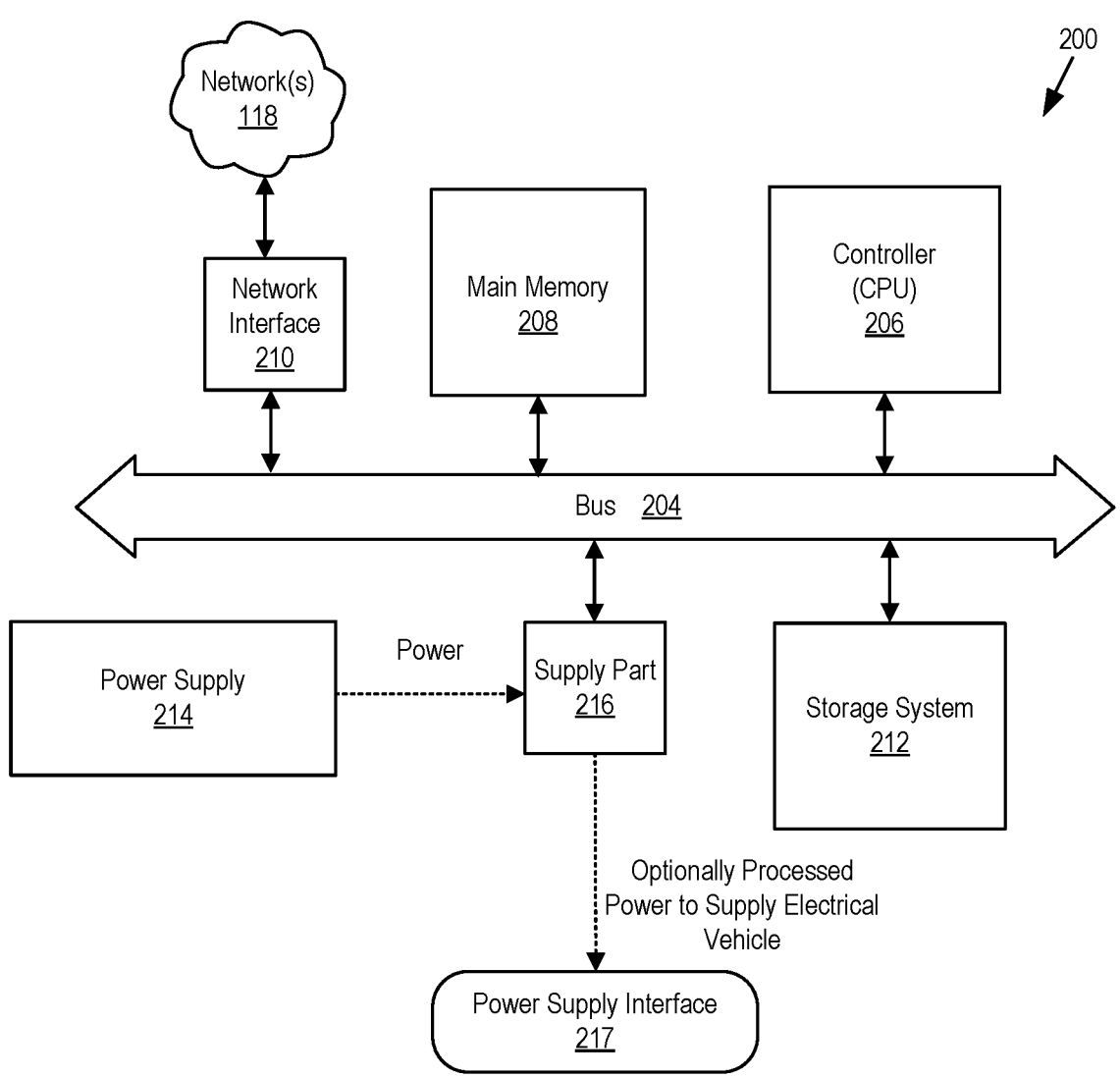
FIG. 2 illustrates example parts of an example EV charging station, in accordance with some embodiments of the present disclosure.

FIG. 2 illustrates example parts of an example EV charging station 200, in accordance with some embodiments of the present disclosure. The EV charging station 200 can be communicatively coupled to the network(s) 118 as shown. In some embodiments, EV charging station 200 is the station 102 or any of the other EV charging stations illustrated in FIG. 1. EV charging station 200 includes at least a bus 204, a controller 206 (such as a CPU), a main memory 208, a network interface 210, a data storage system 212, a power supply 214 or at least a connection to the power supply, and a supply part 216. Power supply interface 217 can physically couple supply part 216 to the charger 314 and/or the battery 316 of electric vehicle 300 illustrated in FIG. 3, depending on the implementation. The bus 204 communicatively couples the controller 206, the main memory 208, the network interface 210, the data storage system 212, and the supply part 216, and all of these parts can be part of a charge station computing device (such as charge station computing device 110). The EV charging station 200 includes a computer system that includes at least controller 206, main memory 208 (e.g., read-only memory (ROM), flash memory, dynamic random access memory (DRAM) such as synchronous DRAM (SDRAM) or Rambus DRAM (RDRAM), static random access memory (SRAM), etc.), and data storage system 212, which communicate with each other via bus 204 (which can include multiple buses).

To put it another way, FIG. 2 is a block diagram of an example EV charging station 200 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 210) to other machines in a LAN, an intranet, an extranet, and/or the Internet (e.g., network(s) 118). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Controller 206 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Controller 206 can also be one or more special-purpose processing devices such as an application specific integrated circuit (ASIC), a field programmable gate array (FPGA), a digital signal processor (DSP), network processor, or the like. Controller 206 is configured to execute instructions for performing the operations and steps discussed herein. Controller 206 can further include a network interface device such as network interface 210 to communicate over one or more communications network (such as network(s) 118).

The data storage system 212 can include a machine-readable storage medium (also known as a computer-readable medium) on which is stored one or more sets of instructions or software embodying any one or more of the methodologies or functions described herein. The instructions can also reside, completely or at least partially, within the main memory 208 and/or within the controller 206 during execution thereof by the computer system, the main memory 208 and the controller 206 also constituting machine-readable storage media. While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In the station 200, power transmits through supply part 216, which can be controlled via signals from the bus 204 which can be signals from the controller 206. The power then transmits from the supply part 216 to the power supply interface 217. In an electric vehicle (such as vehicle 300 illustrated in FIG. 3), power received in the interface 217 transmits into a battery of the vehicle (such as battery 316 shown in FIG. 3). A charger controls the charging of the battery. The charger is controlled by signals from the bus 304 if the charger is in or part of the station. The charger is controlled by a bus of a vehicle if the charger is in or part of the vehicle (e.g., see charger 314 shown in FIG. 3). The supply part 216 can be or include the charger, and in such examples the charger can convert available power from power supply 214 in accordance with a certain charging standard.

Figure 3:
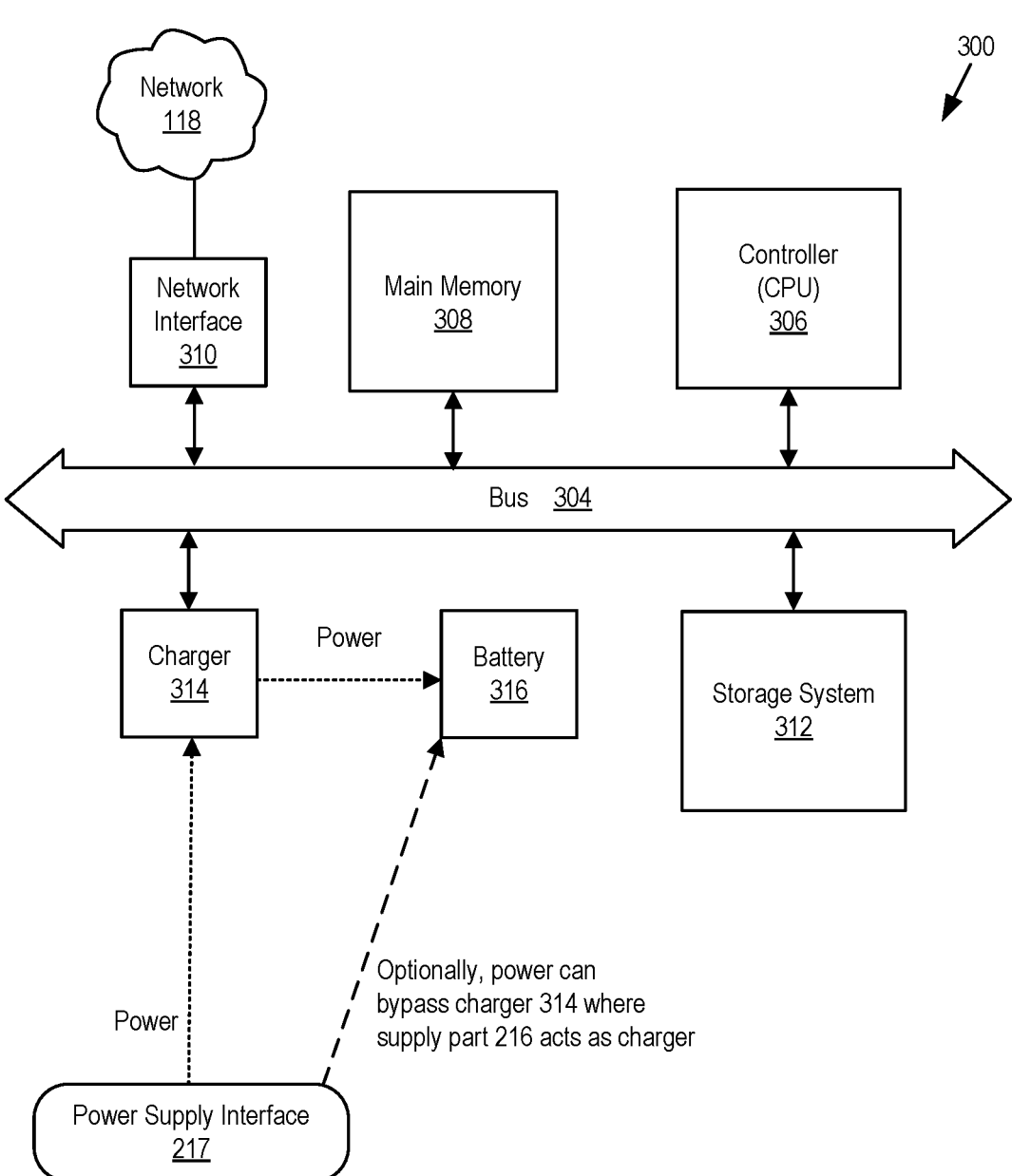
FIG. 3 illustrates example parts of an example electric vehicle, in accordance with some embodiments of the present disclosure.

FIG. 3 illustrates example parts of an example electric vehicle 300, in accordance with some embodiments of the present disclosure. The vehicle 300 can be communicatively coupled to the network(s) 118 as shown. In some embodiments, vehicle 300 is the vehicle 104 or any of the other vehicles illustrated in FIG. 1. Electric vehicle 300 includes at least a bus 304, a controller 306 (such as a CPU), a main memory 308, a network interface 310, a storage system 312, a charger 314 or at least a connection to the charger, and a battery 316. Power supply interface 217 can electrically couple supply part 216 to either the charger 314 or the battery 316 of electric vehicle 300 illustrated in FIG. 3, dependent on the implementation. The bus 304 communicatively couples the controller 306, the main memory 308, the network interface 310, the data storage system 312, the charger 314, and the battery 316, and all of these parts can be part of a vehicle computing device (such as vehicle computing device 112). The electric vehicle 300 includes a computer system that includes at least controller 306, main memory 308 (e.g., read-only memory (ROM), flash memory, dynamic random access memory (DRAM) such as synchronous DRAM (SDRAM) or Rambus DRAM (RDRAM), static random access memory (SRAM), etc.), and data storage system 312, which communicate with each other via bus 304 (which can include multiple buses).

To put it another way, FIG. 3 is a block diagram of an example electric vehicle 300 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 310) to other machines in a LAN, an intranet, an extranet, and/or the Internet (e.g., network(s) 118). The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Controller 306 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Controller 206 can also be one or more special-purpose processing devices such as an application specific integrated circuit (ASIC), a field programmable gate array (FPGA), a digital signal processor (DSP), network processor, or the like. Controller 306 is configured to execute instructions for performing the operations and steps discussed herein. Controller 306 can further include a network interface device such as network interface 310 to communicate over one or more communications network (such as network(s) 118).

The data storage system 312 can include a machine-readable storage medium (also known as a computer-readable medium) on which is stored one or more sets of instructions or software embodying any one or more of the methodologies or functions described herein. The instructions can also reside, completely or at least partially, within the main memory 308 and/or within the controller 306 during execution thereof by the computer system, the main memory 308 and the controller 306 also constituting machine-readable storage media. While the memory, controller, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The charger 314 can include an onboard converter that can plug into a standard electrical outlet or a high-capacity appliance outlet. The charger 314 can control the attributes of the electric energy being conducted to the battery 316.

The battery 316 or any other battery described herein can be or include one or more electric-vehicle batteries (EVBs) and/or one or more traction batteries which are batteries used to power the propulsion of electric vehicles, such as any one of the vehicles described herein. The battery 316 can be a rechargeable battery. The battery 316 differs from starting, lighting, and ignition (SLI) batteries because it is designed to give power over sustained periods of time. The battery 316 can be or use one or more deep-cycle batteries instead of SLI batteries. The battery 316 can be designed with a high ampere-hour capacity. The battery 316 can be characterized by a relatively high power-to-weight ratio, specific energy and energy density; this can reduce the weight of the vehicle and improve its performance. The battery 316 can include at least one of lead-acid ("flooded", deep-cycle, and VRLA), NiCd, nickel-metal hydride, lithium-ion, Li-ion polymer, and, zinc-air and molten-salt batteries.

The power provided by the charging station 200 for charging an electric vehicle, such vehicle 300, can initially be from power supply 214 which can be a power supply external and/or internal to the station 200 and can include a power grid, a solar power supply system, and/or a battery bank. Power can be delivered from station 200 to vehicle 300 over a coupling (such as power supply coupling 107 or power supply interface 217). The power conducted over the coupling can be used to charge a battery of a vehicle (such as battery 108 or 316). Control lines (such as couplings 114 and 116 and buses 204 and 304) can operate the battery of the vehicle and the supply part (such as supply part 106 or 216) of the station. The control lines can be respective control lines of the vehicle and the station as well as one or more control lines that directly link computing devices of the station and the vehicle (e.g., see control line 117 depicted in FIG. 1). Also, network connections can link the computing devices through one or more communications networks such as network(s) 118.

The peer-to-peer network of some embodiments can be a collection of nodes and peer-to-peer connections. For example, computing node 182 illustrated in FIG. 1 can be a node of a peer-to-peer network supported by computing devices connected through network(s) 118. In some embodiments, devices other than devices of the vehicles and stations are the nodes of the peer-to-peer network. Alternatively, the devices of the stations and/or the vehicles can be nodes of the peer-to-peer network. For example, the respective computer system of station 200 and vehicle 300 can be nodes of a peer-to-peer network. The network can include a peer-to-peer network that can support a blockchain. In other words, vehicles and/or the stations may or may not be in the peer-to-peer network such as the peer-to-peer network that implements the blockchain—depending on the embodiment.

As shown in FIGS. 1-3, an EV charging station (such as stations 102, 152, and 200) can include a supply part (e.g., supply part 106 or 216) configured to supply electric energy to at least one vehicle battery (e.g., battery 108 or 316). Also, an EV charging station can include a computing device (such as computing device 110 or 152) configured to manage supplying of electric energy to electric vehicles (such as vehicles 104, 160, 170, and 300) and record, to blocks of a blockchain, respective messages associated with the supplying of the energy. If, for example, computing devices of a vehicle and a station (such as computing devices 110 and 112) are both computing nodes in a peer-to-peer network (such as a blockchain peer-to-peer network), the devices can take turns to sign an agreed upon record and then broadcast their respective copies of the record in the peer-to-peer network (e.g., see FIG. 8).

As shown in FIG. 1, the EV charging station can also include a transactions module (e.g., transactions module 124) of a station application (e.g., vehicle charging application 120) stored in and executable by the computing device of the EV charging station. The transactions module can be executable by the computing device of the EV charging station to receive a vehicle communication from a vehicle application (e.g., vehicle charging application 140) running on a computing device (e.g., vehicle computing device 112) of an electric vehicle (e.g., vehicle 104, 160, 170, or 300) of the plurality of electric vehicles to initiate supplying of electric energy to the vehicle by the EV charging station. The vehicle communication can include vehicle identification information, a vehicle public key, a vehicle certificate associating the vehicle public key to the vehicle identification information, a charging request, a respective freshness factor, and a vehicle digital signature of the request signed using a vehicle private key corresponding to the vehicle public key (e.g., see FIG. 6). It is to be understood for at least the purposes of this disclosure that a digital signature of or in a message is used to verify that the message is from an entity as stated. The digital signature is not for the verification that the entity is as stated and thus the entity can be trusted. A freshness factor of the respective freshness factors of the vehicle communications can be any one of or any combination of a timestamp, a message sequence number, a current total message count, a pseudo-random number, a random number, a percentage-based charging status of the vehicle, and a temporal-based charging status of the vehicle.

In response to receiving the vehicle communication, the transactions module can also be executable by the computing device of the EV charging station to verify the vehicle certificate and then verify the vehicle digital signature using the vehicle public key.

In response to a successful verification of the vehicle digital signature, the transactions module can also be executable by the computing device of the EV charging station to send a station communication to the vehicle application. The station communication can include station identification information, a station public key, a station certificate associating the station public key to the station identification information, a message, and a station digital signature of the request signed using a station private key corresponding to the station public key (e.g., see FIG. 7). The message of the station communication can be one of or a combination of a request for payment information, a charging status, an acknowledgment, or an instruction.

In response to a successful verification of the vehicle digital signature, the transactions module can also be executable by the computing device of the EV charging station to initiate supplying electric energy to the electric vehicle via the supply part.

During supplying of the electric energy by the supply part, the transactions module can also be executable by the computing device of the EV charging station to receive a plurality of additional vehicle communications from the vehicle application. Each communication of the plurality of additional vehicle communications can include the vehicle identification information, the vehicle public key, a respective vehicle digital signature of the communication, and a respective freshness factor (e.g., see FIG. 6).

In response to receiving a given communication of the plurality of additional vehicle communications, the transactions module can also be executable by the computing device of the EV charging station to verify the vehicle digital signature using the vehicle public key and determine whether a session between the station application and the vehicle application has expired. The transactions module can also be executable to continue to permit the supply of the electric energy in response to successful verification of the vehicle digital signature and a determination that the session has not expired. And, the transactions module can also be executable to terminate the supply of the electric energy to complete the supplying of electric energy in response to at least a determination that the session has expired.

An EV charging station can also include a blockchain management module (e.g., blockchain module 122) of the station application stored in and executable by the computing device of the EV charging station. The blockchain management module can be executable by the computing device of the EV charging station to generate a new block of the blockchain (e.g., see block 804 of blockchain 800 depicted in FIG. 8, which was a new block before blocks 802, 806, and 808 were generated). The blockchain management module can also be executable by the computing device of the EV charging station to record, to the new block of the blockchain, information associated with an instance of supplying of electric energy to an electric vehicle by the EV charging station. The blockchain management module can be further executable to record a time of charging, an amount of electric energy supplied, and an amount paid to the new block. The blockchain management module can be further executable to record digital signatures from both the vehicle and the EV charging station to the new block. The blockchain management module can be further executable to generate and record, to the new block, a hash of all data recorded to the blockchain that includes a hash of the recorded data of the new block and a hash of all data recorded to blocks of the blockchain prior to generation of the new block. The blockchain management module can be further executable to record, to the new block, the hash of all data recorded to blocks of the blockchain prior to generation of the new block. The hash of the recorded data of the new block can be included in at least one of the digital signatures from the vehicle and the EV charging station.

The blockchain management module can be further executable to broadcast the recorded data of the new block into a peer-to-peer network. The computing device of the EV charging station can be a peer node in the peer-to-peer network, and the computing device of the EV charging station can include a storage system (e.g., storage system 212) configured to store a copy of the recorded data of the new block.

As shown in FIGS. 1-3, an electric vehicle (such as vehicle 104, 160, 170, or 300) can include a battery (e.g., battery 108 or 316) configured to receive electric energy from a supply part (e.g., supply part 106 or 216). The electric vehicle can also include a computing device (e.g., vehicle computing device 112) configured to manage receiving of electric energy from a plurality of charging stations (e.g., stations 102, 150, and 200) and record, to blocks of a blockchain (e.g., see the blockchain 800 illustrated in FIG. 8), respective messages associated with the receiving of the energy. The electric vehicle can also include a transactions module (such as transactions module 144) of a vehicle application (e.g., vehicle charging application 140) stored in and executable by the computing device of the vehicle.

Transactions module of the vehicle application can be executable by the computing device of the vehicle to receive a station communication from a station application (e.g., vehicle charging application 120) running on a computing device of a charging station (e.g., see computing devices 110 and 152) of the plurality of charging stations to continue initiation of supplying of electric energy to the vehicle from the EV charging station. The station communication can include station identification information, a station public key, a station certificate associating the station public key to the station identification information, a charging response to a charging request of the vehicle, and a station digital signature of the response signed using a station private key corresponding to the station public key (e.g., see FIG. 7).

In response to receiving the station communication, the transactions module of the vehicle application can also be executable by the computing device of the vehicle to verify the station certificate and then verify the station digital signature using the station public key.

In response to a successful verification of the station digital signature, the transactions module of the vehicle application can also be executable by the computing device of the vehicle to send a vehicle communication to the station application. The vehicle communication can include vehicle identification information, a vehicle public key, a vehicle certificate associating the vehicle public key to the vehicle identification information, a message, a respective freshness factor, and a vehicle digital signature of the response signed using a vehicle private key corresponding to the vehicle public key (e.g., see FIG. 6). The message of the station communication can be any one of or combination of a request for payment information, a charging status, an acknowledgment, and an instruction. A freshness factor of the respective freshness factors of the vehicle communications can be any one of or combination of a timestamp, a message sequence number, a current total message count, a pseudorandom number, a random number, a percentage-based charging status of the vehicle, and a temporal-based charging status of the vehicle.

In response to a successful verification of the station digital signature, the transactions module can also be executable to initiate receiving electric energy by the battery of the electric vehicle from the supply part of the charging station.

During receiving of the electric energy by the battery (108), the transactions module of the vehicle application can also be executable by the computing device of the vehicle to receive a plurality of additional station communications from the station application. Each communication of the plurality of additional station communications can include the station identification information, the station public key, and a respective station digital signature of the communication.

In response to receiving a given communication of the plurality of additional station communications, the transactions module of the vehicle application can also be executable by the computing device of the vehicle to verify the station digital signature using the station public key and determine whether a session between the station application (e.g., station application 120) and the vehicle application (e.g., vehicle application 140) has expired. The transactions module can also be executable to continue to permit the receiving of the electric energy in response to successful verification of the station digital signature and a determination that the session has not expired. The transactions module can also be executable to terminate the receiving of the electric energy to complete the supplying of electric energy in response to at least a determination that the session has expired.

An electric vehicle (e.g., vehicle 104, 160, 170, and 300) can also include a blockchain management module (e.g., blockchain management module 122) of the vehicle application (e.g., vehicle charging application 140) stored in and executable by the computing device (e.g., vehicle computing device 112) of the electric vehicle. The blockchain management module of the vehicle application can be executable by the computing device of the electric vehicle to generate a new block of the blockchain (e.g., new block 802 of blockchain 800 depicted in FIG. 8). The blockchain management module of the vehicle application can be executable by the computing device of the electric vehicle to record, to the new block of the blockchain, information associated with an instance of supplying of electric energy to an electric vehicle from the EV charging station (e.g., see FIG. 8). The blockchain management module can also be executable by the computing device to record a time of charging, an amount of electric energy supplied, and an amount paid to the new block (e.g., see FIG. 8, new block 802). The blockchain management module can also be executable by the computing device to record digital signatures from both the vehicle and the EV charging station to the new block (see FIG. 8). The blockchain management module can also be executable by the computing device to generate and record, to the new block (e.g., new block 802), a hash of all data recorded to the blockchain that includes a hash of the recorded data of the new block and a hash of all data recorded to blocks of the blockchain prior to generation of the new block. The blockchain management module can also be executable to record, to the new block, the hash of all data recorded to blocks of the blockchain prior to generation of the new block (e.g., see FIG. 8, new block 802). The hash of the recorded data of the new block can be included in at least one of the digital signatures from the vehicle and the EV charging station.

As mentioned herein, it is to be understood for at least the purposes of this disclosure that a digital signature of or in a message is used to verify that the message is from an entity as stated. The digital signature is not for the verification that the entity is as stated and thus the entity can be trusted.

The blockchain management module can also be further executable by the computing device of the vehicle to broadcast the recorded data of the new block (e.g., new block 802) into a peer-to-peer network. The computing device of the electric vehicle can be a peer computing node in the peer-to-peer network, and the computing device of the vehicle can include a storage system (e.g., storage system 312) configured to store a copy of the recorded data of the new block.

Figure 4:
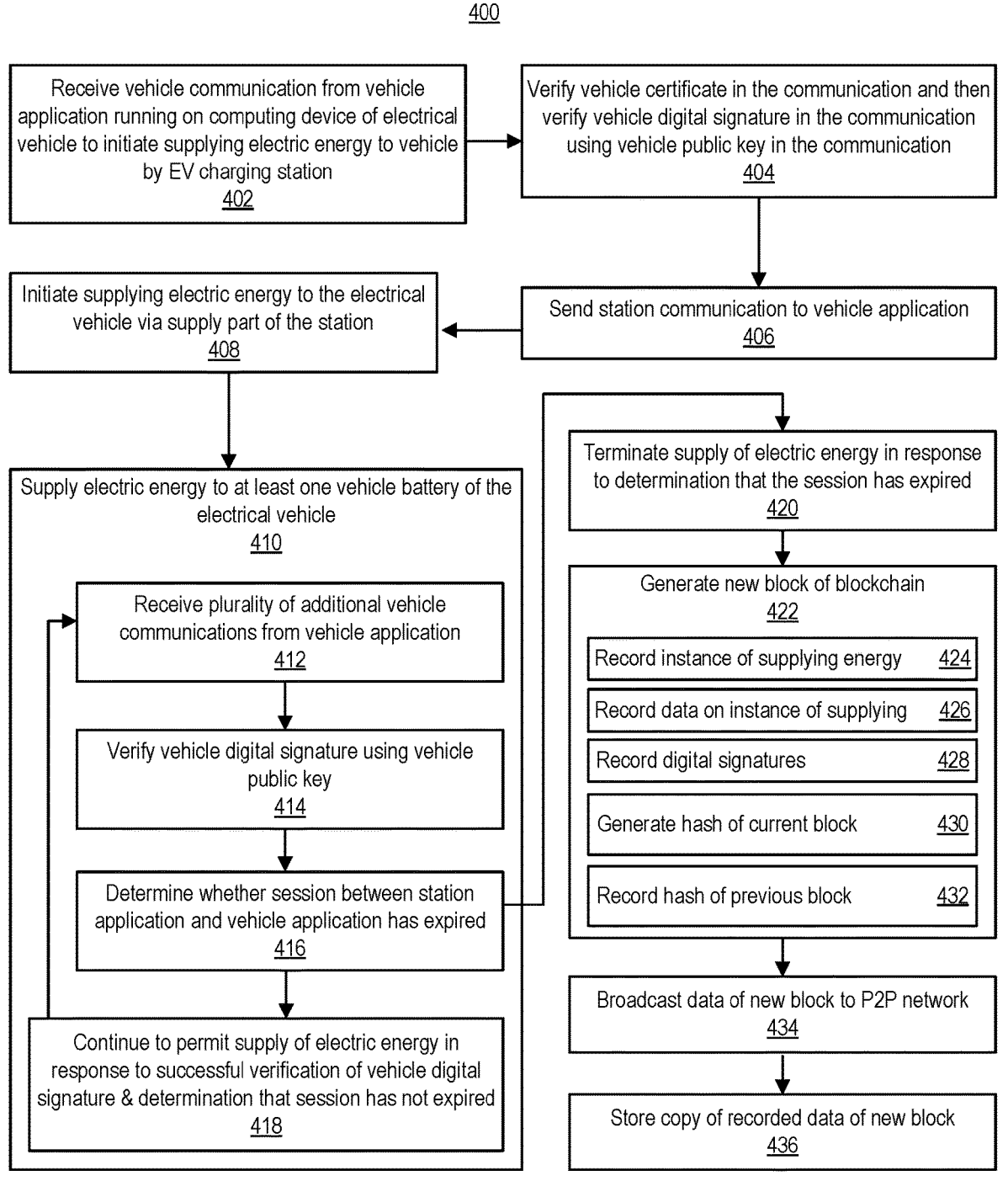
FIG. 4 is a flow diagram of an example method performed by example parts of an example EV charging station, in accordance with some embodiments of the present disclosure.

FIG. 4 is a flow diagram of an example method 400 performed by example parts of an example EV charging station (such as EV charging station 102, 150, or 200) in accordance with some embodiments of the present disclosure. The method 400 begins, at step 402, with receiving, by a transactions module (e.g., the module 124) of a station application (e.g., the application 120) stored in and executable by a computing device (e.g., computing device 110) of an EV charging station (e.g., station 102), a vehicle communication from a vehicle application (e.g., application 140) running on a computing device (e.g., computing device 112) of an electric vehicle (e.g., vehicle 104) to initiate supplying of electric energy to the vehicle by the EV charging station (102). The vehicle communication can include vehicle identification information, a vehicle public key, a vehicle certificate associating the vehicle public key to the vehicle identification information, a charging request, a respective freshness factor, and a vehicle digital signature of the request signed using a vehicle private key corresponding to the vehicle public key (e.g., see FIG. 6). It is to be understood for at least the purposes of this disclosure that a digital signature of or in a message is used to verify that the message is from an entity as stated. The digital signature is not for the verification that the entity is as stated and thus the entity can be trusted.

At step 404, in response to receiving the vehicle communication, the transactions module verifies the vehicle certificate and then verifies the vehicle digital signature using the vehicle public key. At step 406, in response to a successful verification of the vehicle digital signature, the transactions module sends a station communication to the vehicle application. The station communication can include station identification information, a station public key, a station certificate associating the station public key to the station identification information, a message, and a station digital signature of the request signed using a station private key corresponding to the station public key (e.g., see FIG. 7). The message of the station communication can be a request for payment information, a charging status, an acknowledgment, an instruction, and/or any combination thereof.

At step 408, in response to a successful verification of the vehicle digital signature, the transactions module initiates supplying electric energy to the electric vehicle via supply part (e.g., supply part 106) of the station. At step 410, the supply part supplies electric energy to at least one vehicle battery (e.g., battery 108).

At step 412, during supplying of the electric energy by the supply part, the transactions module receives a plurality of additional vehicle communications from the vehicle application (e.g., application 140). Each communication of the plurality of additional vehicle communications can include the vehicle identification information, the vehicle public key, a respective vehicle digital signature of the communication, and a respective freshness factor (e.g., see FIG. 6). A freshness factor of the respective freshness factors of the vehicle communications can be a timestamp, a message sequence number, a current total message count, a pseudo-random number, a random number, a percentage-based charging status of the vehicle, a temporal-based charging status of the vehicle, and/or any combination thereof.

At step 414, in response to receiving a given communication of the plurality of additional vehicle communications, the module verifies the vehicle digital signature using the vehicle public key and determines, at step 416, whether a session between the station application (120) and the vehicle application (140) has expired. At step 418, the module continues to permit the supply of the electric energy in response to successful verification of the vehicle digital signature and a determination that the session has not expired. Or, at step 420, the module terminates the supply of the electric energy to complete the supplying of electric energy in response to at least a determination that the session has expired.

Figure 8:
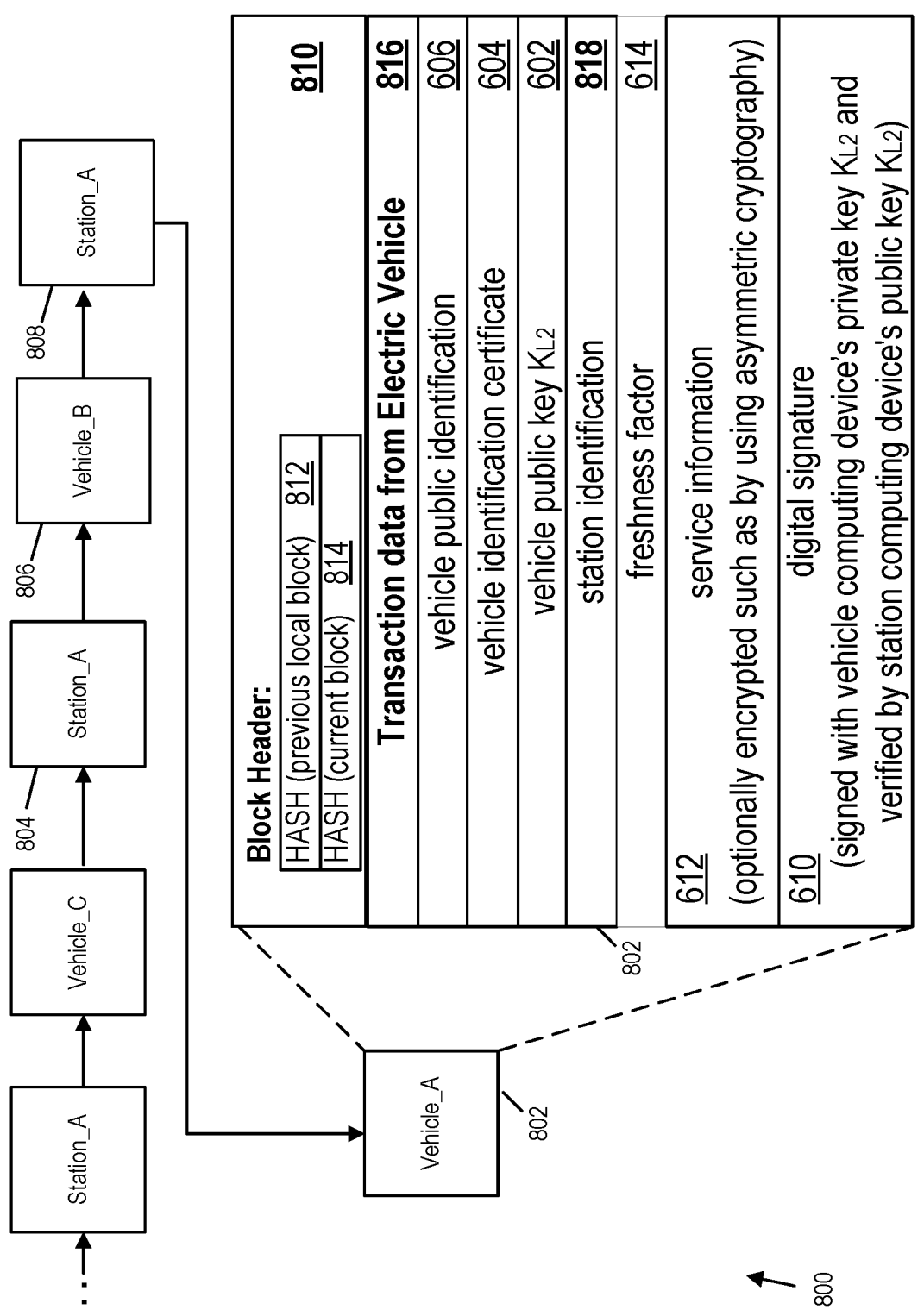
FIG. 8 illustrates a part of an example blockchain of blocks, wherein each block includes information on an instance of an example EV charging station supplying electric energy to an example electric vehicle.

At step 422, a blockchain management module (e.g., blockchain management module 122) of the station application (e.g., application 120), stored in the computing device (e.g., computing device 110) of the EV charging station (e.g., station 102), generates a new block of the blockchain (e.g., see block 804 of blockchain 800 depicted in FIG. 8, which was a new block before blocks 802, 806, and 808 were generated). At step 424, the blockchain management module records, to the new block of the blockchain, information associated with an instance of supplying of electric energy to an electric vehicle by the EV charging station. At step 426, the blockchain management module records a time of charging, an amount of electric energy supplied, and an amount paid to the new block. At step 428, the blockchain management module records digital signatures from both the vehicle and the EV charging station to the new block.

At step 430, the blockchain management module generates and records, to the new block, a hash of all data recorded to the blockchain that includes a hash of the recorded data of the new block and a hash of all data recorded to blocks of the blockchain prior to generation of the new block. At step 432, the blockchain management module generates and records, to the new block, the hash of all data recorded to blocks of the blockchain prior to generation of the new block. The hash of the recorded data of the new block is included in at least one of the digital signatures from the vehicle and the EV charging station. A record in some embodiments can be considered a block in the blockchain. The record can have data content such as descriptive data of a transaction, a timestamp, a hash of a prior record. A record can be signed by one or more parties. The digital signature on the record has a hash of the record. The hash of the record would to be part of the record itself (e.g., when the hash is computed for the digital signature, the hash is unknown and cannot be used to compute the hash itself).

At step 434, the blockchain management module broadcasts the recorded data of the new block into a peer-to-peer network. In some embodiments, the computing device (e.g., computing device 110) of the EV charging station (e.g., station 102) is a peer node in the peer-to-peer network, and in such embodiments the method 400 can further include storing, by a storage system (e.g., storage system 212) of the computing device of the EV charging station, a copy of the recorded data of the new block (e.g., see step 436).

Figure 5:
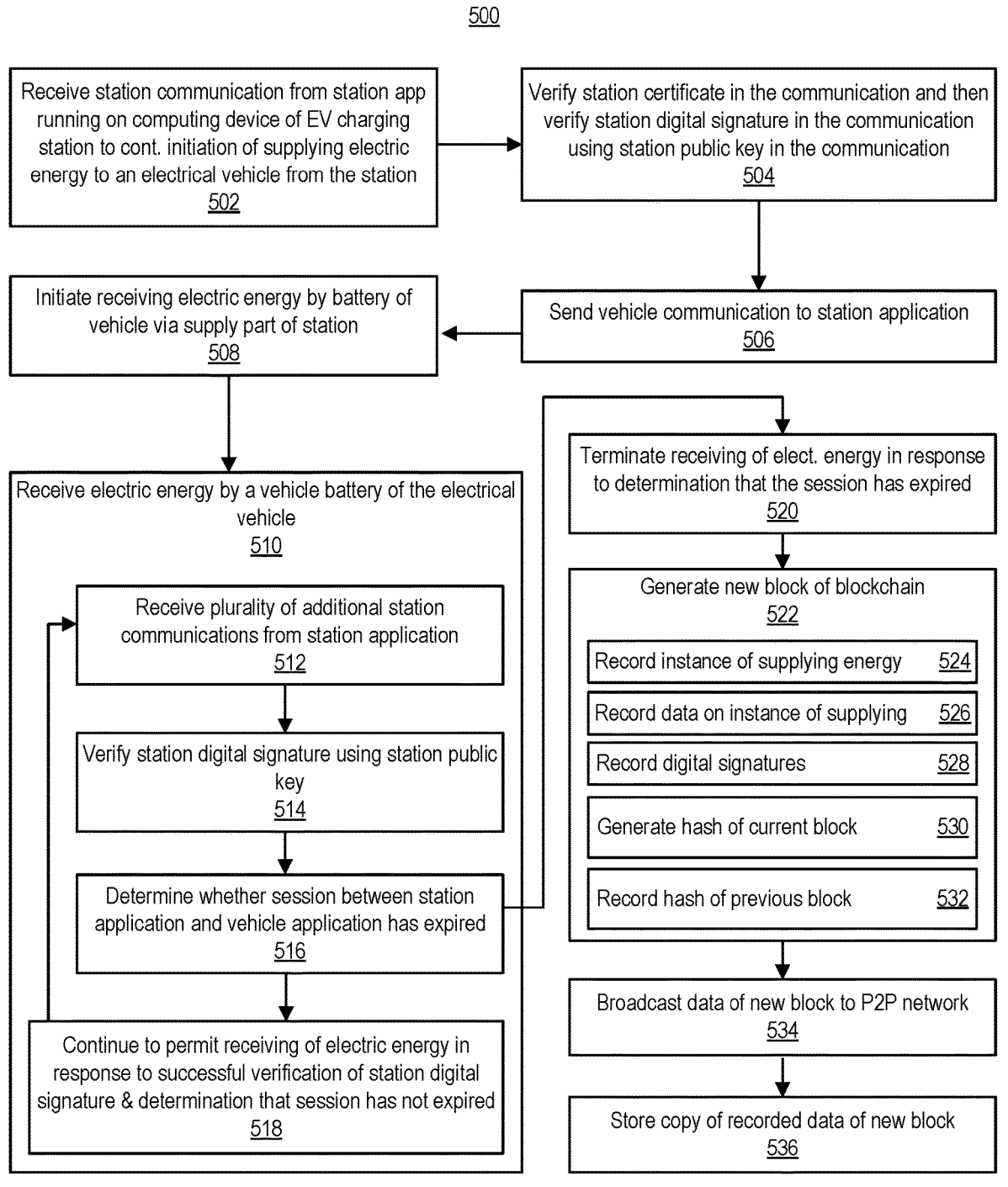
FIG. 5 is a flow diagram of an example method performed by example parts of an example electric vehicle, in accordance with some embodiments of the present disclosure.

FIG. 5 is a flow diagram of an example method 500 performed by example parts of an example electric vehicle (such as vehicles 104, 160, 170, or 300), in accordance with some embodiments of the present disclosure. The method 500 begins, at step 502, with receiving, by a transactions module (e.g., the module 144) of a vehicle application (e.g., the application 140) stored in and executable by a computing device (e.g., computing device 112) of an electric vehicle (e.g., vehicle 104), a station communication from a station application (e.g., application 120) running on a computing device (e.g., computing device 110) of an EV charging station (e.g., station 102) to continue initiation of supplying of electric energy to the vehicle from the EV charging station. The station communication can include station identification information, a station public key, a station certificate associating the station public key to the station identification information, a charging response to a charging request of the vehicle, and a station digital signature of the response signed using a station private key corresponding to the station public key (e.g., see FIG. 7). It is to be understood for at least the purposes of this disclosure that a digital signature of or in a message is used to verify that the message is from an entity as stated. The digital signature is not for the verification that the entity is as stated and thus the entity can be trusted.

At step 504, in response to receiving the station communication, the transactions module verifies the station certificate and then verifies the station digital signature using the station public key. At step 506, in response to a successful verification of the station digital signature, the transactions module sends a vehicle communication to the station application. The vehicle communication can include vehicle identification information, a vehicle public key, a vehicle certificate associating the vehicle public key to the vehicle identification information, a message, a respective freshness factor, and a vehicle digital signature of the response signed using a vehicle private key corresponding to the vehicle public key (e.g., see FIG. 6). The message of the vehicle communication can be payment information, a charging status, an acknowledgment, an instruction, and/or any combination thereof. A freshness factor of the respective freshness factors of the vehicle communications can be a timestamp, a message sequence number, a current total message count, a pseudorandom number, a random number, a percentage-based charging status of the vehicle, a temporal-based charging status of the vehicle, and/or any combination thereof.

At step 508, in response to a successful verification of the station digital signature, the transactions module initiates receiving electric energy by a battery (e.g., battery 108) of the electric vehicle from a supply part (e.g., supply part 106) of the EV charging station. At step 510, the battery receives electric energy from the supply part.

At step 512, during receiving of the electric energy by the battery, the transactions module receives a plurality of additional station communications from the station application (e.g., application 120). Each communication of the plurality of additional station communications can have the station identification information, the station public key, and a respective station digital signature of the communication (e.g., see FIG. 7).

At step 514, in response to receiving a given communication of the plurality of additional station communications, the module verifies the station digital signature using the station public key and determines, at step 516, whether a session between the station application (120) and the vehicle application (140) has expired. At step 518, the module continues to permit the receiving of the electric energy in response to successful verification of the station digital signature and a determination that the session has not expired. Or, at step 520, the module terminates the receiving of the electric energy to complete the supplying of electric energy in response to at least a determination that the session has expired.

At step 522, a blockchain management module (e.g., blockchain management module 122) of the vehicle application (e.g., application 140), stored in the computing device (e.g., computing device 112) of the electric vehicle (e.g., vehicle 104), generates a new block of the blockchain (e.g., new block 802 of blockchain 800). At step 524, the blockchain management module records, to the new block of the blockchain, information associated with an instance of supplying of electric energy to an electric vehicle by the EV charging station. At step 526, the blockchain management module records a time of charging, an amount of electric energy supplied, and an amount paid to the new block (e.g., see FIG. 8, new block 802). At step 528, the blockchain management module records digital signatures from both the vehicle and the EV charging station to the new block.

At step 530, the blockchain management module generates and records, to the new block, a hash of all data recorded to the blockchain that includes a hash of the recorded data of the new block and a hash of all data recorded to blocks of the blockchain prior to generation of the new block. At step 532, the blockchain management module generates and records, to the new block, the hash of all data recorded to blocks of the blockchain prior to generation of the new block. At step 534, the blockchain management module broadcasts the recorded data of the new block into a peer-to-peer network. In some embodiments, the computing device (e.g., computing device 112) of the vehicle (e.g., vehicle 104) is a peer node in the peer-to-peer network, and in such embodiments the method 500 can further include storing, by a storage system (e.g., storage system 312) of the computing device of the vehicle, a copy of the recorded data of the new block (e.g., see step 536).

With respect to the method 400, method 500, or any other method, process, or operation described herein, in some embodiments, a non-transitory computer-readable storage medium stores instructions that, when executed by at least one processing device (such as controller 206 or controller 306), cause the at least one processing device to perform the method 400, method 500, or any other method, process, or operation described herein, and/or any combination thereof.

FIG. 6 illustrates example data included in an example communication 600 sent from an example computing device of an example electric vehicle to an example computing device of an example EV charging station, in accordance with some embodiments of the present disclosure. And, FIG. 7 illustrates example data included in example communication 700 sent from an example computing device of an EV charging station to an example computing device of an example electric vehicle, in accordance with some embodiments of the present disclosure.

Asymmetric cryptography can be used for mutual authentication between an electric vehicle and a charge station, which can be found in the implementation of the certificates, digital signatures on the exchanged messages, and/or the device identity composition system (such as shown by the electric vehicle communication illustrated in FIG. 6 and the EV charging station communication illustrated in FIG. 7). Each of the vehicle computing device and the EV charging station computing device has a public key (e.g., public keys 602 and 702) of the other party from the mutual authentication. Both parties can accept each other's certificate (e.g., certificates 604 and 704) where there is a subscription activated for example.

The exchanging of the certificates can confirm each identity (e.g., identities 606 and 706) and that the parties know each other as well as confirm that a subscription exists between the vehicle and the station such that a payment can be processed according to the subscription. For example, if credit card or other billing information is on file, there is no need to transmit such information over the air in a wireless message exchange. The subscription can be based on a pre-paid model, or another payment/billing option as well. A subscription is not a prerequisite for handshaking certificate between the parties.

The messages exchange between the vehicle and the station is a process that can be secured via a device identity composition system. The device identity composition system can be used for the asymmetric cryptography. In such embodiments, the private key (e.g., private key 608 or 708) can be or can be based on a secret value called Unique Device Secret (UDS) that is injected during manufacture of a computing device of the vehicle and/or a computing device of the EV charging station. In some example implementations of the device identity composition system, a UDS can only ever exist within the computing device on which it was provisioned.

In some embodiments, the device identity composition system can include layer $L_0$ that derives $K_{L0}$, the Fuse Derived Secret (FDS), by using a key derivative function (KDF). Algorithmically, $K_{L0}=$KDF [UDS, HASH("Identity of $L_1$")] (e.g., see the private key $K_{L2}$ referred to in FIGS. 6 and 7). The other layers ($L_k$) can provide to the next ones ($L_{k+1}$) a set of keys and certificates (e.g., see the public key $K_{L2}$ referred to in FIGS. 6 and 7). The layers being layers of a device architecture starting with the immutable loader $L_0$, then the device identity composition system core $L_1$, application firmware $L_2$, operating system and applications $L_{k+1}$. Each layer can provide integrity for the next layer and so on. And, each layer can verify the certificates showing identities of the devices of the vehicle and the EV charging station.

In some embodiments, asymmetric cryptography is used for mutual authentication between a vehicle and an EV charging station. The mutual authentication occurs over a local wired and/or wireless network (such as NFC, Bluetooth, WIFI network) and is initiated by the vehicle and the charge station exchanging respective public key certificates, which include digital signatures for mutual authentication. Both parties will accept each other's certificate where there is a subscription activated (activated with a credit card for example). If no subscription exists, then the vehicle can proceed with providing a credit card number or some other form of billing information to the station (such as through public key encryption). Also, since each party has a public key of the other party from the mutual authentication, encrypted messages can be sent between the parties and each party can decrypt a message with its own private key (since this technology uses asymmetric cryptography).

In general, ownership of public keys is known to the public. If a public key can decrypt a message, it can be inferred that the message is encrypted using the corresponding private key. The message cannot be encrypted by the public key. If only a specific individual, vehicle or station has the private key, it can be inferred that the message is from the specific individual, vehicle or station. To be able to trust the inferred results, a trusted entity needs to certify that the public key does correspond to a private key held by the specific individual, vehicle or station so that the public key can be used to determine the identity of the individual, vehicle or station.

Intentional and unintentional man-in-middle attacks can occur by another vehicle approaching the station while the valid vehicle is authenticated for charging with the station. After valid vehicle and the station have been mutually authenticated to start a charging session, and in the middle of the session, the other vehicle may connect to the station. This may cause the charging to the other vehicle to be billed to the valid vehicle. To keep this from happening, the valid vehicle and the station can regularly communicate signed messages (e.g., see respective digital signatures 610 and 710 of communications 600 and 700) during the session to avoid the other vehicle to charge using the billing information of valid vehicle. For example, the valid vehicle can message "VehicleValidID charging at XYZ timestamp" once every minute, and the station can respond "StationValidID charging VehicleValidID at XYZ timestamp" (e.g., see service information 612 and 712). This allows the station to confirm that it is servicing the valid vehicle, until the valid vehicle ends the session and/or stops the regular messages during charging. Also, each message from the valid vehicle can be differentiated by including a freshness factor (e.g. see freshness factor 614) in each message so that the other vehicle cannot simply record a message received from the valid vehicle and resend it again and again and pretend to be the valid vehicle. Also, the messages can be signed by the valid vehicle so that the other vehicle cannot imitate the valid vehicle. To increase integrity of the messages exchanged between the parties the EV charging station can also include a freshness factor (e.g., see freshness factor 714).

FIG. 8 illustrates a part of an example blockchain 800 of blocks, wherein each block includes a block header (e.g., see block header 810) and information on an instance of an example EV charging station supplying electric energy to an example electric vehicle. As illustrated, each block of the part of the blockchain 800 was generated by or is at least associate with an EV charging station identified as "Station_A", a first electric vehicle identified as "Vehicle_A", and a second electric vehicle identified as "Vehicle_B". It is to be understood for the purposed of this disclosure that the depiction of the blockchain 800 in FIG. 8 is only a partial depiction of the blockchain and that there may be many more stations and vehicles that generate or are at least associated with blocks of the blockchain that are not depicted in FIG. 8.

In general, the blockchain 800 can be or include a distributed "ledger" or database with duplicative copies of records stored independently on the nodes of the peer-to-peer network implemented the blockchain. In some embodiments, no centralized node is responsible for controlling and/or managing the entire blockchain. Each node can manage, validate its copies, and participate in the determination of blockchain network consensus.

Block 802 is depicted as exploded so that at least some of the content of block 802 are depicted. The exploded illustration of block 802 shows the block including a block header 810 that includes hashes 812 and 814. Hash 812 can be or include the hash of all data recorded to blocks of the entire blockchain prior to generation of the new block 802. Specifically, the hash 812 can be generated at step 532 of method 500 if the vehicle is generating the hash and the new block. Hash 814 can be or include the hash of all data recorded to the blockchain that includes a hash of the recorded data of the new block and a hash of all data recorded to blocks of the blockchain prior to generation of the new block. Specifically, the hash 814 can be generated at step 530 of method 500 if the vehicle is generating the hash and the new block.

In some embodiments, the computing devices of an electric vehicle and a EV charging station (e.g., see computing devices 110 and 112) are peer nodes in a peer-to-peer network, such as a network that supports blockchain 800. In such embodiments each of the devices can store, by a respective storage system, a copy of the recorded data of a block of the blockchain such as the new block 802 and previous block 808. As shown block 808 was generated and occurs immediately prior to new block 802. Each of block 802 and 808 can include data from one or more transactions associated with supplying electric energy from the station to the electric vehicle. This data can include data in communications from the devices of both the station and the vehicle, such as shown by data in the transactions data 816 from the vehicle. Blocks 802 and 808 can also include data from station communication 700 (although not depicted in FIG. 8). FIG. 8 also shows the station identification 818 in the transactions data from the vehicle, which can further confirm the legitimacy of the transaction between the station and the vehicle.

The information included in exploded depiction of block 802 is just one of many examples of information that a block may contain. In some embodiments, a block includes only or additionally information mentioned as recorded to a block in method 400 or method 500. Also, it is to be understood, that one block could be associated with multiple vehicles, multiple stations, or any combination thereof.

Figure 9A:
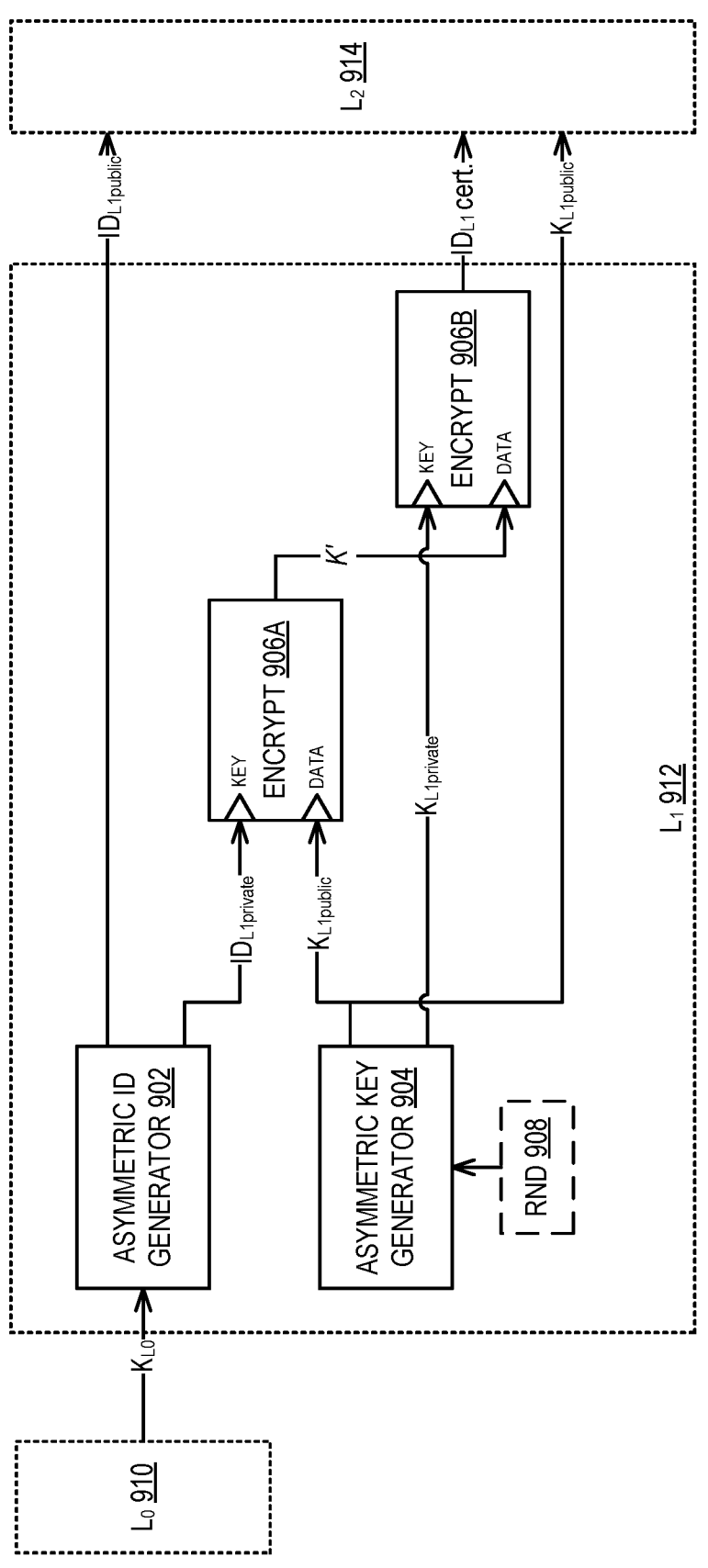
FIG. 9A illustrates an apparatus or non-transitory computer readable storage medium for generating a triple according to some embodiments.

FIG. 9A illustrates an apparatus or non-transitory computer readable storage medium for generating a triple according to some embodiments. The triple can include a public identifier of a party (such as an electric vehicle or a EV charging station), a public key of the party, and/or a certificate of the party. The triple can be found in the messages and communications described herein (e.g., see FIGS. 6 and 7).

As illustrated, the $L_0$ software 910 and $L_1$ software 912 operate on an identity composition device. The identity composition device can be a part of any one of the computing devices described herein. The $L_0$ code 910 includes firmware executing in ROM of the identity composition device. The $L_0$ code 910 is responsible for generating a first key ($K_{L0}$) (also referred to as a fuse-derived secret, FDS) according to the following formula: $FDS=K_{L0}=KDF$ (UDS, HASH (identity of $L_1$)), where KDF is a one-way function such as an HMAC-SHA256 function, UDS is a unique device secret set during manufacture of the device operating the $L_0$ code 910, HASH includes a second one-way function such as a SHA256 function, and the identify of $L_1$ includes host configuration parameters of the $L_1$ code 912.

The $L_0$ code 910 exports $K_{L0}$ to the $L_1$ code 912 which is then used to generate a triple representing the $L_1$ code 912. This triple is then exported by the $L_1$ code 912 to the $L_2$ code 914. As discussed, the $L_2$ code 914 can include code executing on an external device or, in some embodiments, a remote device. For example, the $L_0$ code 910 and $L_1$ code 912 can execute on a first party while the $L_2$ 914 can execute on a separate party.

Generally, as described, the $L_1$ code 912 is responsible for generating keys (referred to as "alias keys") and a triple for the $L_1$ code 912 itself.

As illustrated, the $L_1$ code 912 generates an identifier for the $L_1$ code 912 via an asymmetric identifier generator 902. The generator 902 takes the $K_{L0}$ key as a seed input and outputs a deterministic public key ($ID_{L1public}$) and private key ($ID_{L1private}$). The $L_1$ code 912 exports the public key ($ID_{L1public}$) to the $L_2$ code 914, the usage of which will be described in the description of FIG. 9B.

Additionally, the $L_1$ code 912 generates a second key pair using a second asymmetric key generator 904. This key generator 904 takes a random number generated by the random number generator 908 as a seed input and outputs a second deterministic public key ($K_{L1public}$) and private key ($K_{L1private}$). The $L_1$ code 912 exports the public key ($K_{L1public}$) to the $L_2$ code 914, the usage of which will be described in the description of FIG. 9B.

The $L_1$ code 912 additionally employs a double-encryption technique for generating the ID certificate portion of the triple exported to the $L_2$ code 914. Specifically, the $L_1$ code 912 first encrypts the $K_{L1public}$ key using the $ID_{L1public}$ key as the encryption key using a first encryption module 906a, generating encrypted ciphertext K'. This ciphertext is then used as the data supplied to a second encryption module 906b while the $K_{L1private}$ generated by the second generator 904 is used as the encryption key. The result of the second encryption module 906B is a doubly-encrypted ciphertext K'' which is exported as the $ID_{L1}$ certificate. The specific choice of encryption algorithm (and corresponding decryption algorithm in FIG. 9B) is not limited in the disclosure.

Figure 9B:
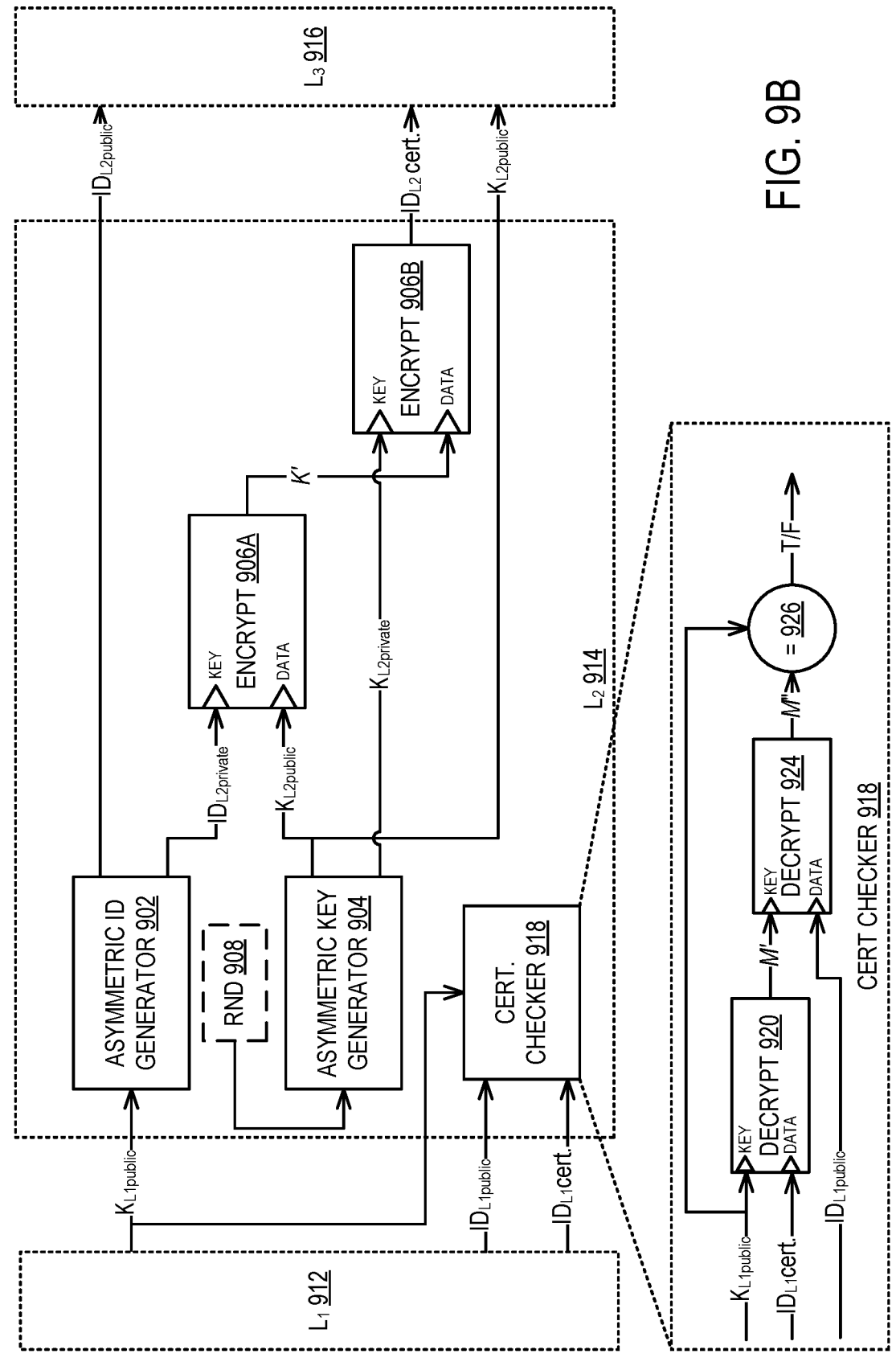
FIG. 9B illustrates an apparatus or non-transitory computer readable storage medium for verifying a triple and generating a second layer triple according to some embodiments.

FIG. 9B illustrates an apparatus or non-transitory computer readable storage medium for verifying the triple and generating a second layer triple according to some embodiments. The figure illustrated in FIG. 9B illustrates the operation of $L_2$ code 914. However, the operations described herein can be generalized for any layer including and beyond the $L_2$ code 914 (e.g., $L_3$ code 916).

In the illustrated embodiment, the $L_2$ code 914 receives a triple from $L_1$ code 912, generated as described in FIG. 9A. $L_2$ code 914 performs operations similar to that of $L_1$ code 912 with respect to generating a $L_2$ triple and those details are not repeated herein but are incorporated by reference for identically numbered elements. One notable difference in the triple-generation circuitry or software is that the first generator is seeded with the $K_{L1public}$ value generated by the $L_1$ code 912 and not the value of $K_{L0}$ (the fuse-derived secret) as described in FIG. 9A.

Additionally, the $L_2$ code 914 includes a certificate checker 918 which may be implemented in hardware (i.e., a dedicated circuit) or in software or firmware. Details of the certificate checker 918 are shown in exploded view in the figure. The certificate checker 918 verifies the authenticity of the triple received from the $L_1$ code 912. In some embodiments, the certificate checker 918 acts as a gating function to the remaining components (i.e., preventing the generation of an $L_2$ triple if the triple is not valid).

As illustrated, the certificate checker 918 decrypts the $ID_{L1}$ certificate using the Ku public key via first decryption module 920. The resulting key M' is then used as the key for a second decryption module 924 which use the key M' to decrypt the $ID_{L1}$ public key. Finally, the resulting plaintext M'' is compared to the original public key ($K_{L1public}$) via comparator 926. If the result of the comparator is positive, the triple is confirmed as valid. If not, the triple is marked as invalid.

In the illustrated embodiment, the certificate checker 918 can execute independently of the triple generation circuitry/software 902, 904, 906a-b. In this manner, triples of various entities can be verified by the $L_2$ code 914.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A computing device, comprising:

a processor; and a memory storing a vehicle charging application and a blockchain management module and executable by the processor;

wherein the vehicle charging application is configured to cause the computing device to:

receive a vehicle communication to initiate supplying electric energy, the vehicle communication comprising vehicle identification information, a vehicle public key, a vehicle certificate associating the vehicle public key to the vehicle identification information, a respective freshness factor, and a vehicle digital signature signed using a vehicle private key corresponding to the vehicle public key;

verify the vehicle certificate and a vehicle digital signature in the vehicle communication and verify the vehicle digital signature using the vehicle public key in the vehicle communication; and in response to a successful verification of the vehicle digital signature:

send a station communication, the station communication comprising station identification information, a station public key, a station certificate associating the station public key to the station identification information, and a station digital signature signed using a station private key corresponding to the station public key; and initiate supplying electric energy to an electric vehicle; and wherein during supplying of the electric energy, the vehicle charging application is configured to cause the computing device to:

receive additional vehicle communications, each respective communication of the plurality of additional vehicle communications comprising the vehicle identification information, the vehicle public key, a respective vehicle digital signature of the respective communication, and a respective freshness factor configured to differentiate the respective communication and prevent the respective communication to be reused; and in response to receiving a given communication of the additional vehicle communications:

determine whether a session with the vehicle application has expired;

continue supplying the electric energy in response to a determination that the session has not expired; and terminate the supplying of the electric energy in response to at least a determination that the session has expired.

2. The computing device of claim 1, wherein the blockchain management module is further configured to record digital signatures from both a vehicle and a charging station to the new block.

3. The computing device of claim 2, wherein the blockchain management module is further configured to:

generate and record, to the new block, a hash of all data recorded to the blockchain that comprises a hash of the recorded data of the new block and a hash of all data recorded to blocks of the blockchain prior to generation of the new block; and record, to the new block, the hash of all data recorded to blocks of the blockchain prior to generation of the new block.

4. The computing device of claim 3, wherein the hash of the recorded data of the new block is included in at least one of the digital signatures from the vehicle and the charging station.

5. The computing device of claim 3, wherein the blockchain management module is further configured to broadcast the recorded data of the new block into a peer-to-peer network.

6. The computing device of claim 5, wherein the computing device is a peer node in the peer-to-peer network, and wherein the computing device comprises a storage system configured to store a copy of the recorded data of the new block.

7. The computing device of claim 1, wherein in response to the successful verification of the vehicle digital signature, the vehicle charging application is configured to send a station communication, wherein the station communication includes a message, and wherein the message is selected from the group consisting of a request for payment information, a charging status, an acknowledgment, and an instruction.

8. The computing device of claim 1, wherein the freshness factor is selected from the group consisting of a timestamp, a message sequence number, a current total message count, a pseudorandom number, a random number, a percentage-based charging status of the vehicle, and a temporal-based charging status of the vehicle.

9. The computing device of claim 1, further comprising a blockchain management module of the station application stored in and executable by the computing device, the blockchain management module configured to:

generate a new block of a blockchain; and record, to the new block of the blockchain, information associated with an instance of supplying electric energy.

10. The computing device of claim 9, wherein the blockchain management module is further configured to record a time of charging, an amount of electric energy supplied, and an amount paid to the new block.

11. A method, comprising:

receiving, by a transactions module stored in and executable by a computing device of a charging station, a vehicle communication to initiate supplying of electric energy by the charging station, the vehicle communication comprising vehicle identification information, a vehicle public key, a vehicle certificate associating the vehicle public key to the vehicle identification information, a respective freshness factor, and a vehicle digital signature signed using a vehicle private key corresponding to the vehicle public key;

verifying, by the transactions module, a vehicle certificate and a vehicle digital signature in the vehicle communication and then verifying the vehicle digital signature using the vehicle public key in the vehicle digital signature; and in response to a successful verification of the vehicle digital signature:

sending, by the transactions module, a station communication to the vehicle charging application, the station communication comprising station identification information, a station public key, a station certificate associating the station public key to the station identification information, and a station digital signature signed using a station private key corresponding to the station public key; and initiating, by the transactions module, supplying electric energy;

during supplying of the electric energy:

receiving, by the transactions module, a plurality of additional vehicle communications from the vehicle application, each respective communication of the plurality of additional vehicle communications comprising the vehicle identification information, the vehicle public key, a respective vehicle digital signature of the respective communication, and a respective freshness factor configured to differentiate the respective communication and prevent the respective communication to be reused;

determining, by the transactions module, whether a session between a station application and a vehicle application has expired;

continuing, by the transactions module, supplying of the electric energy in response to a determination that the session has not expired; and terminating, by the transactions module, supplying of the electric energy in response to at least a determination that the session has expired.

12. The method of claim 11, further comprising:

generating and recording, by a blockchain management module, to the new block, a hash of all data recorded to the blockchain that comprises a hash of the recorded data of the new block and a hash of all data recorded to blocks of the blockchain prior to generation of the new block; and record, to the new block, the hash of all data recorded to blocks of the blockchain prior to generation of the new block.

13. The method of claim 12, wherein the hash of the recorded data of the new block is included in at least one of the digital signatures from the vehicle and the charging station.

14. The method of claim 12, further comprising broadcasting, by the blockchain management module, the recorded data of the new block into a peer-to-peer network.

15. The method of claim 14, wherein the computing device of the charging station is a peer node in the peer-to-peer network, and wherein the method further comprises storing, by a storage system of the computing device of the charging station, a copy of the recorded data of the new block.

16. The method of claim 11, further comprising, sending a station communication, wherein the station communication includes a message, wherein the message of the station communication is selected from the group consisting of a request for payment information, a charging status, an acknowledgment, and an instruction, and wherein the freshness factor of the vehicle communication is selected from the group consisting of a timestamp, a message sequence number, a current total message count, a pseudorandom number, a random number, a percentage-based charging status of the vehicle, and a temporal-based charging status of the vehicle.

17. The method of claim 11, further comprising:

generating, by a blockchain management module of the station application stored in the computing device of the charging station, a new block of a blockchain; and recording, to the new block of the blockchain, information associated with an instance of supplying of electric energy to an electric vehicle by the charging station.

18. The method of claim 17, further comprising recording, by the blockchain management module, a time of charging, an amount of electric energy supplied, and an amount paid to the new block.

19. The method of claim 18, further comprising recording, by the blockchain management module, digital signatures from both the vehicle and the charging station to the new block.

20. A computing device, comprising:

a vehicle charging application comprising a transactions module and a blockchain management module stored in and executable by the computing device;

wherein the transactions module is configured to:

receive a station communication from a station application, the station communication comprising station identification information, a station public key, a station certificate associating the station public key to the station identification information, a charging response to a charging request, and a station digital signature of the response signed using a station private key corresponding to the station public key;

verify the station digital signature and then verify the station digital signature using the station public key; and in response to a successful verification of the station digital signature:

send a vehicle communication to the station application, the vehicle communication comprising vehicle identification information, a vehicle public key, a vehicle certificate associating the vehicle public key to the vehicle identification information, and a vehicle digital signature of the response signed using a vehicle private key corresponding to the vehicle public key;

initiate receiving electric energy from a charging station; and during receiving of the electric energy:

receive additional station communications from the station application, each respective communication of the plurality of additional station communications comprising the station identification information, the station public key, a respective station digital signature of the respective communication; and a respective freshness factor configured to differentiate the respective communication and prevent the respective communication to be reused;

verify the station digital signature;

determine whether a session with a vehicle application has expired;

continue receiving the electric energy in response to a determination that the session has not expired; and terminate the receiving of the electric energy in response to at least a determination that the session has expired.

* * * * *